(12) United States Patent
Sakuma

(10) Patent No.: US 7,621,180 B2
(45) Date of Patent: Nov. 24, 2009

(54) FLOW SENSOR WITH METAL FILM RESISTOR

(75) Inventor: Noriyuki Sakuma, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/320,475

(22) Filed: Jan. 27, 2009

(65) Prior Publication Data

US 2009/0188314 A1 Jul. 30, 2009

(30) Foreign Application Priority Data

Jan. 29, 2008 (JP) .............................. 2008-017015

(51) Int. Cl.
*G01F 1/68* (2006.01)
(52) U.S. Cl. .................................. 73/204.26
(58) Field of Classification Search .. 73/204.24–204.26
See application file for complete search history.

(56) References Cited

U.S. PATENT DOCUMENTS

| | | | | |
|---|---|---|---|---|
| 5,313,832 A | * | 5/1994 | Stephan et al. ........... | 73/204.26 |
| 5,763,775 A | * | 6/1998 | Sato et al. ................ | 73/204.26 |
| 6,118,166 A | | 9/2000 | Shoji et al. | |
| 6,615,655 B1 | * | 9/2003 | Sakai et al. .............. | 73/204.26 |
| 6,626,037 B1 | * | 9/2003 | Wado et al. .............. | 73/204.26 |
| 6,644,113 B2 | * | 11/2003 | Kawai et al. ............. | 73/204.26 |
| 2007/0056366 A1 | | 3/2007 | Sakuma et al. | |
| 2008/0168650 A1 | * | 7/2008 | Sakuma ...................... | 29/612 |

FOREIGN PATENT DOCUMENTS

| JP | 10-213470 | 1/1997 |
|---|---|---|
| JP | 11-287687 | 4/1998 |
| JP | 2007-071737 | 9/2005 |
| JP | 2008-170382 | 1/2007 |

* cited by examiner

*Primary Examiner*—Jewel Thompson
(74) *Attorney, Agent, or Firm*—Stites & Harbison PLLC; Juan Carlos A. Marquez, Esq.

(57) ABSTRACT

There is a need for providing a flow sensor with metal film resistor that improves detection sensitivity using a metal film for a resistance heat detector and a resistance temperature detector. The flow sensor with metal film resistor is structured to form a resistance heat detector, a resistance temperature detector for resistance heat detector for measuring temperature of the resistance heat detector, an upstream resistance temperature detector, a downstream resistance temperature detector, and an air resistance temperature detector on a silicon substrate. Plural floating-island insulators are provided for the resistance heat detector and within wiring thereof.

15 Claims, 12 Drawing Sheets

FLOW SENSOR WITH METAL FILM RESISTOR

CLAIM OF PRIORITY

The present application claims priority from Japanese Patent Application JP 2008-017015 filed on Jan. 29, 2008, the content of which is hereby incorporated by reference into this application.

FIELD OF THE INVENTION

The present invention relates to a flow sensor with metal film resistor and more particularly to a flow sensor with metal film resistor appropriate to a thermal air flow meter for measuring air flow taken into an internal combustion engine.

BACKGROUND OF THE INVENTION

A flow sensor with metal film resistor is provided for an electrically controlled fuel injection system of an internal combustion engine of an automobile and the like and is used for an air flow meter that measures the intake air flow. Presently, the thermal type air flow sensor with metal film resistor goes mainstream because it can directly detect the mass air volume.

In particular, constant attention has been focused on a thermal airflow sensor fabricated by the semiconductor micro-machining technology because such sensor can reduce costs and operate on low electric power. For example, JP-A No. 213470/1998 discloses a conventional airflow sensor technology. The technology uses platinum (Pt) for a heater element (heater) and a temperature detection element (sensor). The technology discloses a diaphragm structure fabricated by removing Si films from the bottoms parts of the heater and the sensor. The method disclosed in JP-A No. 287687/1999 uses a heater element (heater) and two temperature detection elements (sensors) sandwiching the heater at the sensor center. The heater and the sensors are fabricated by, forming a groove in an oxidized film, embedding a platinum film, and flattening the film through the use of chemical mechanical polishing (CMP).

SUMMARY OF THE INVENTION

However, the above-mentioned conventional technology gives no consideration for the method of groove formation and the layout such as a groove width so as to form the heater and the sensor using the CMP method. When groove widths differ such as a wide heater and a narrow sensor, it cause variations in groove depths due to dry etching process and dependencies on wiring widths such as dishing and erosion due to CMP, thereby the heater and the sensor are given different resistance values. Resistance values for the heater and the sensor are used to calculate a temperature difference ($\Delta$Th) as a reference. When resistance values vary, an external correction resistor needs to be used for adjustment to a design value, increasing costs. Although the correction resistors differ from one chip to another depending on groove depths and degrees of dishing and erosion, the same correction resistor is used under the restriction of a predetermined range, resulting in a decrease of the sensor sensitivity and the detection accuracy. Further more, in the dry etching process, a wafer in-plane distribution causes defective products excluded from the predetermined range. The yield decreases by defective products cause further increases costs.

It is an object of the present invention to provide a flow sensor with metal film resistor capable of achieving accurate flow rate measurement that maintains a constant groove depth despite different groove widths or within a wafer plane, suppresses a resistance variation from a design value, and without an exterior correction resistor.

To achieve the above-mentioned object, a typical aspect of the present invention provides a flow sensor with metal film resistor that ensures the same groove depth by providing a layer that is less easily etched than an insulating film for forming a groove and is formed below the insulating film. Further, the flow sensor uses a layout that provides plural floating-island insulators for heaters and sensors, and within wirings.

According to the present invention, the hardly etched lower layer can prevent groove depths from varying even when etching rates vary due to different groove depths resulting from groove formation by dry etching or when etch present rates distribute in a wafer plane. By settling a layout such as a groove width, it can provide uniform dishing or erosion during CMP, and the heater or the sensor can be provided with a constant wiring height. It is possible to provide a high-precision flow sensor with metal film resistor that causes few variations in resistance values.

BRIEF DESCRIPTION OF THE DRAWINGS

FIG. 3 is a schematic plan view showing arrangement of a thermal air flow meter including the flow sensor with metal film resistor according to the first embodiment of the invention, the flow sensor with metal film resistor being attached to an air intake passage of an internal combustion engine of an automobile and the like;

DETAILED DESCRIPTION OF THE PREFERRED EMBODIMENTS

Embodiments of the present invention will be described in further detail with reference to the accompanying drawings.

First Embodiment

Figure 1:
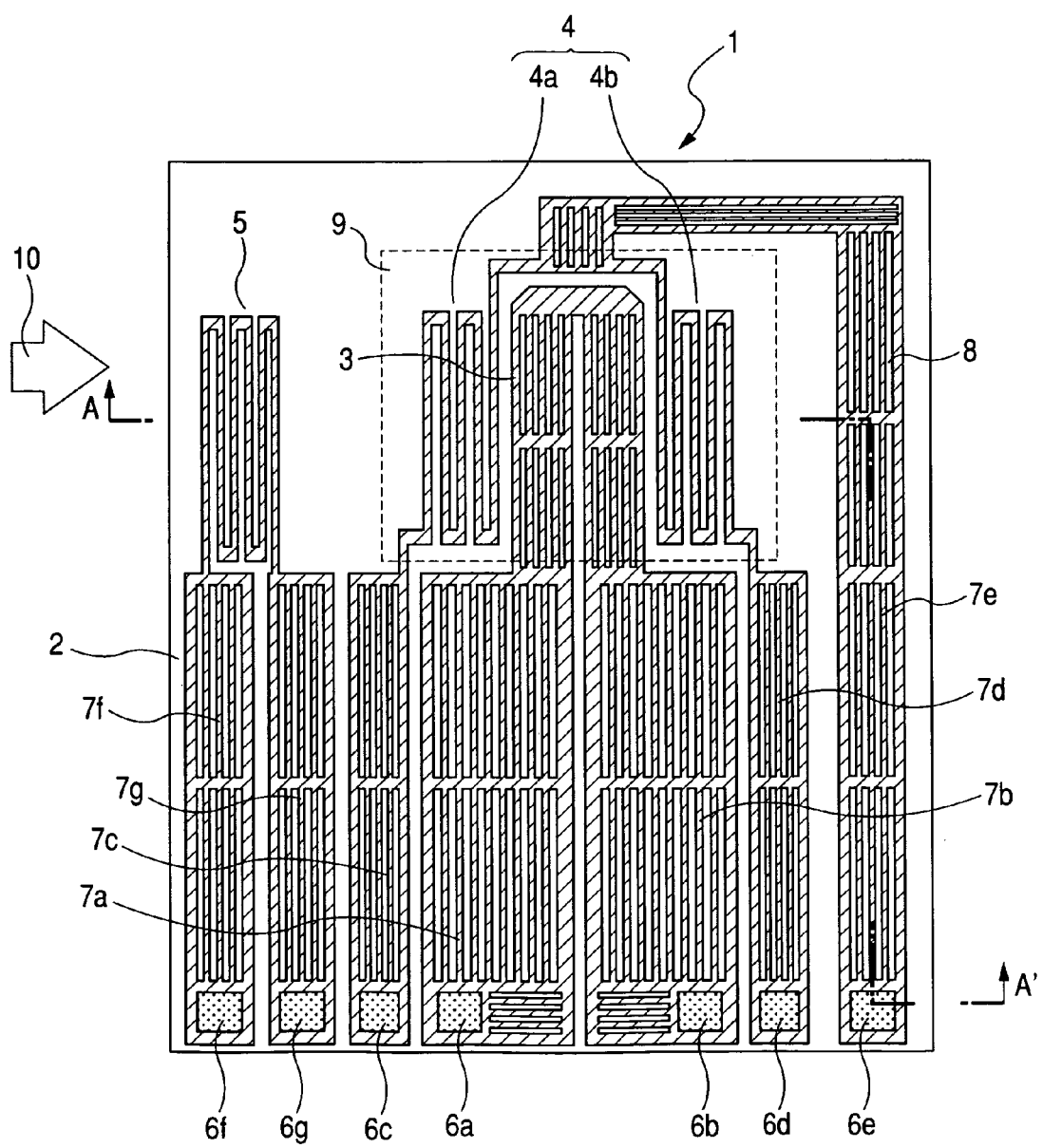
FIG. 1 is a plan view showing a main part of an example of the flow sensor with metal film resistor according to a first embodiment of the present invention.

FIG. 1 is a plan view showing a flow sensor with metal film resistor according to the first embodiment of the present invention. FIGS. 2A through 2G are sectional views taken along the line A-A' in FIG. 1 so as to illustrate processes of fabricating the flow sensor with metal film resistor.

FIG. 1 is a plan view showing an example of the flow sensor according to the first embodiment.

The flow sensor with metal film resistor is provided as a measurement element 1 that includes a semiconductor substrate 2, a resistance heat detector 3, a resistance temperature detector 4, an air resistance temperature detector 5, terminal electrodes 6a through 6g, and leading wires 7a through 7g. The semiconductor substrate 2 is made of single-crystalline silicon. The resistance heat detector 3 is formed on the semiconductor substrate 2 via the intermediation of an insulating film. The resistance temperature detector 4 detects the temperature of air heated by the resistance heat detector 3 and includes an upstream resistance temperature detector 4a and a downstream resistance temperature detector 4b. The air resistance temperature detector 5 measures the air temperature. The terminal electrodes 6a through 6g connect a signal from the measurement element 1 to an external circuit. The leading wires 7a and 7b connect both ends of the resistance heat detector 3 to the terminal electrodes 6a and 6b. The leading wires 7c and 7d connect both ends of the resistance temperature detector 4 to the terminal electrodes 6c and 6d. The leading wire 7e connects to the terminal electrode 6e between an upstream resistance temperature detector 4a and a downstream resistance temperature detector 4b. The leading wires 7f and 7g connect both ends of the air resistance temperature detector 5 to the terminal electrodes 6f and 6g. The resistance heat detector 3 indicates a wiring width of approximately 10 through 150 μm, for example. The resistance temperature detector 4 and the air resistance temperature detector 5 indicate a wiring width of approximately 0.5 through 20 μm, for example. The leading wires 7a through 7g indicate a width of approximately 30 through 500 μm, for example.

The resistance heat detector 3 and the leading wires 7a through 7g are provided with plural floating-island insulators 8 inside and are divided into narrow wiring sections. When viewed from the top, the floating-island insulator 8 is shaped into a square or a rectangle. Preferably, an interval between the adjacent floating-island insulators 8 and an interval between an insulating section outside the wiring and the floating-island insulator 8 is wider than or equal to the wiring width of the resistance temperature detector 4.

Part of the silicon substrate for arranging the resistance heat detector 3 and the resistance temperature detector 4 is removed to provide a diaphragm 9.

The measurement element 1 uses the air resistance temperature detector 5 to measure the air temperature of an air flow 10. The measurement element 1 compares the air temperature with an increase in the heated resistance heat detector 3 to calculate a temperature difference ($\Delta Th$). The flow of air heated by the resistance heat detector 3 changes resistances of the resistance temperature detectors 4a and 4b. The first embodiment can ensure a heat quantity for heating the air when the wiring for the resistance heat detector 3 is wider than the wiring for the resistance temperature detector 4.

The following describes an example method of fabricating the flow sensor with metal film resistor according to the first embodiment with reference to FIGS. 2A through 2G in the order of processes. FIGS. 2A through 2G are fragmentary sectional views taken along the line A-A' in FIG. 1.

Figure 2A:
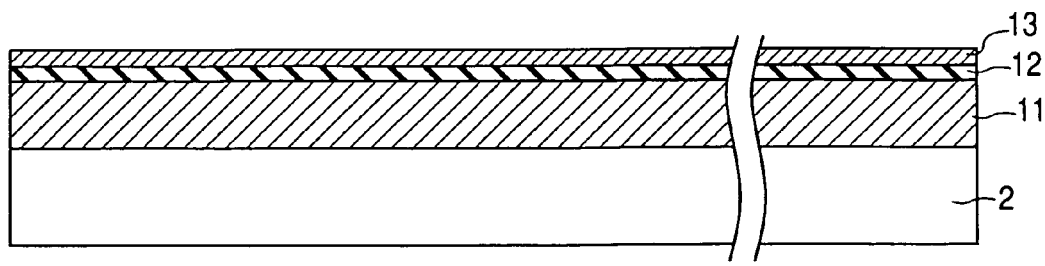
FIG. 2A is a cross-sectional view showing a process of fabricating the flow sensor with metal film resistor according to the first embodiment of the present invention.

As shown in FIG. 2A, the semiconductor substrate 2 made of single-crystalline silicon is prepared. A first insulating film 11, a second insulating film 12, and a third insulating film 13 are sequentially formed on the semiconductor substrate 2. The first insulating film 11 is a $SiO_2$ (silicon oxide) film formed by the thermal oxidation method or the CVD method, for example, to a thickness of 200 through 1000 nm. The second insulating film 12 is a SiN (silicon nitride) film formed by the CVD method, for example, to a thickness of 100 through 200 nm. The third insulating film 13 is a $SiO_2$ (silicon oxide) film formed by the CVD method, for example, to a thickness of 100 through 200 nm.

Figure 2B:
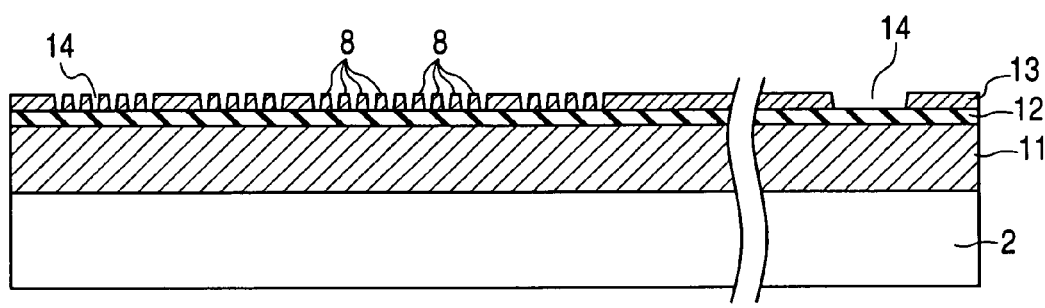
FIG. 2B is a cross-sectional view showing a process of fabricating the flow sensor according to the first embodiment of the present invention.

As shown in FIG. 2B, a groove 14 is formed in the third insulating film 13 according to the dry etching process using a resist pattern mask formed by the photolithography. Different groove widths or a wafer in-plane distribution may cause variations in etching rates during the groove formation process. When an etching rate used for the third insulating film 13 is higher than that for the second insulating film 12, the second insulating film 12 is subject to a lower etching rate for the groove formation. This makes it possible to suppress groove depth variations. It is desirable to specify 3 or more for a ratio of the etching speed rate for the second insulating film 12 to that for the third insulating film 13. A floating-island insulator 8 is formed during the groove formation. The floating-island insulator 8 is surrounded by the groove 14. It is desirable to form the groove 14 so that the top is wider than the bottom when viewed in section. A side wall of the groove 14 preferably has an angle equal to or greater than 60° and equal to or smaller than 89°.

Figure 2C:
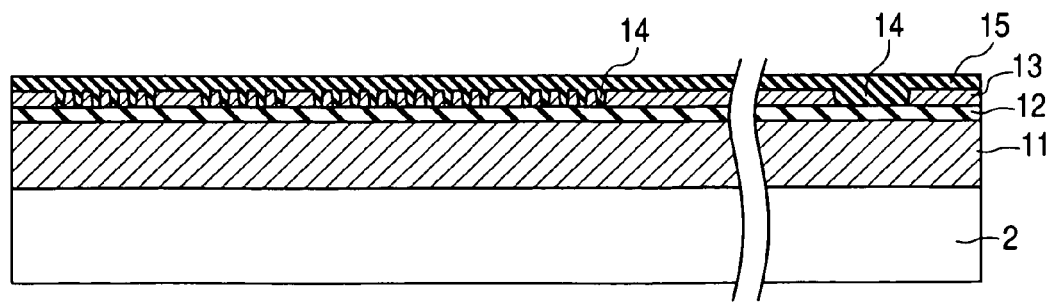
FIG. 2C is a cross-sectional view showing a process of fabricating the flow sensor according to the first embodiment of the present invention.

As shown in FIG. 2C, an Mo (molybdenum) film is deposited as a first metal film 15 using the sputtering method or the CVD method. The first metal film 15 is thick 1.5 times through twice the groove depth. When the sputtering method is used to form the first metal film 15, the semiconductor substrate 2 is maintained to a temperature of 200° C. through 500° C.

Figure 2D:
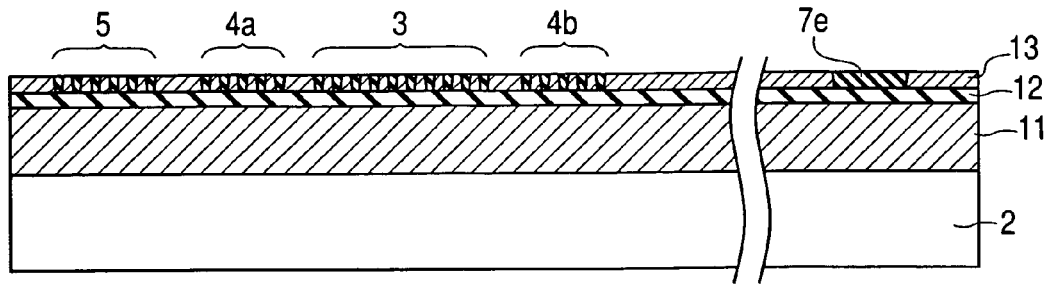
FIG. 2D is a cross-sectional view showing a process of fabricating the flow sensor according to the first embodiment of the present invention.

Next, the chemical mechanical polishing (CMP) is conducted using a slurry, a mixture of acidic polishing solution and hydrogen peroxide solution, to remove the Mo film except the groove. As shown in FIG. 2D, the CMP method forms the resistance heat detector 3, the resistance temperature detectors 4a and 4b, the air resistance temperature detector 5, and the leading wires 7a through 7g. The leading wires 7a through 7g connect the resistance heat detector 3, the resistance temperature detectors 4a and 4b, and the air resistance temperature detector 5 with the terminal electrodes 6a through 6g. When the CMP method is used to polish the Mo film as the first metal film 15, it is possible to suppress dishing or erosion during the CMP and decrease variations in resistance values of the resistance heat detector 3 and the leading wire 7. This is because the floating-island insulator 8 divides large wiring widths of the resistance heat detector 3 and the leading wire 7 into wiring sections each of which is approximately as wide as the resistance temperature detector 4. Heat treatment is conducted at 800° C. or higher, preferably at 1000° C., after depositing the first metal film 15 or after the CMP. The heat treatment lowers a resistivity and improves a temperature coefficient of resistance (TCR).

Figure 2E:
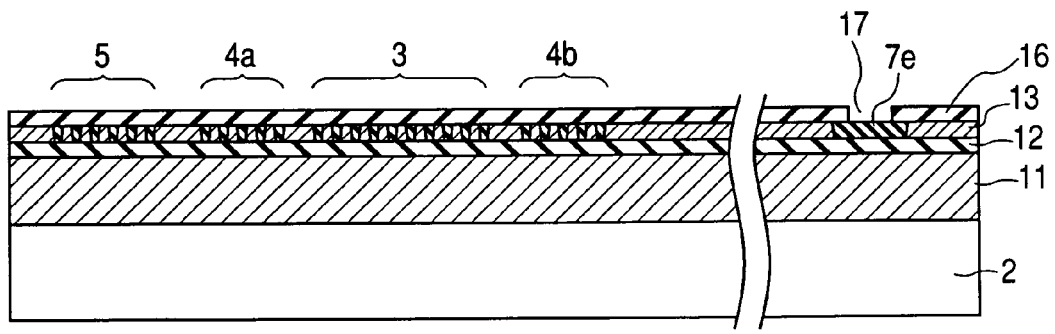
FIG. 2E is a cross-sectional view showing a process of fabricating the flow sensor according to the first embodiment of the present invention.

For example, the CVD method is used to deposit an SiN (silicon nitride) film as a fourth insulating film 16 as thick as 100 through 200 nm over the resistance heat detector 3 or elsewhere as shown in FIG. 2E. The photolithography is used to form a connection hole 17 in accordance with dry or wet etching. The low-temperature CVD method using plasma may be conducted to form the insulating film 16. In this case, the heat treatment is conducted at 800° C. or higher after forming the insulating film 16 to adjust the film thickness so that the diaphragm 9 provides a tensile stress.

Figure 2F:
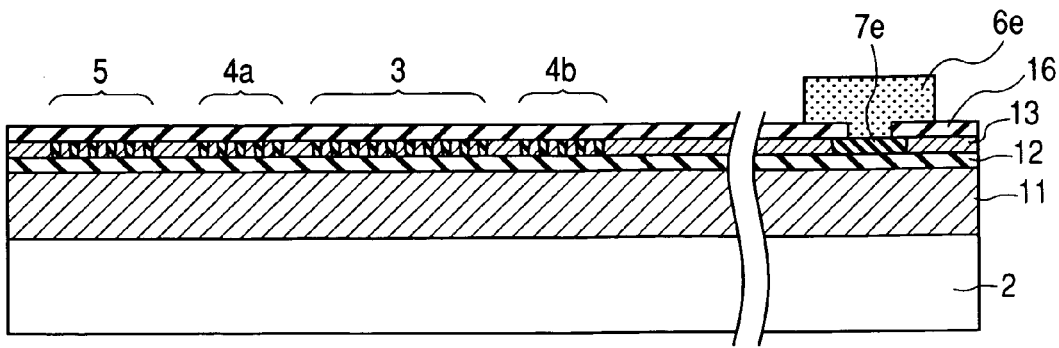
FIG. 2F is a cross-sectional view showing a process of fabricating the flow sensor according to the first embodiment of the present invention.

For example, an Al (aluminum) alloy film is deposited approximately 1 μm thick as a second metal film. Using the photolithography, the film is patterned to form the terminal electrodes 6a through 6g that electrically connect to the leading wires 7a through 7g via the connection hole 17 as shown in FIG. 2F. FIG. 2F shows only the terminal electrode 6e and omits the other terminal electrodes 6a through 6d, 6f, and 6g that are also formed simultaneously with the terminal electrode 6e. Before the deposition, the surfaces of the leading wires 7a through 7g may be sputtering etched with Ar (argon) gas for better contact with the leading wires 7a through 7g during formation of the second metal film. For more reliable contact, the second metal film may be formed using a laminated film of a TiN (titanium nitride) barrier metal film and the Al alloy film. The barrier metal film, when formed to be thicker than the other films, increases a contact resistance. It is desirable to form the barrier metal film to be as thick as approximately 20 nm. However, the barrier metal film can be as thick as 100 nm or less when a full contact area can be ensured to prevent the resistance from increasing. The barrier metal film may be provided as not only the TiN film but also a TiW film, a Ti film, and a laminated film of these.

Figure 2G:
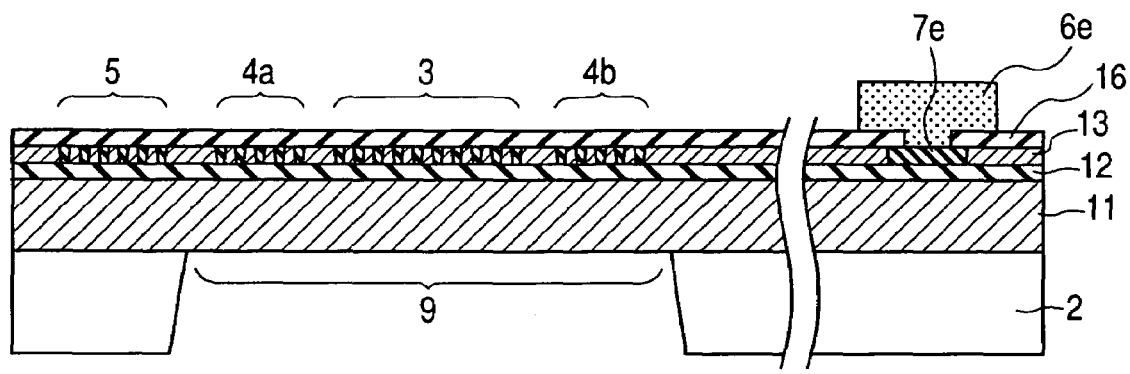
FIG. 2G is a cross-sectional view showing a process of fabricating the flow sensor according to the first embodiment of the present invention.

As shown in FIG. 2G, the photolithography is used to form a resist pattern on the reverse side of the semiconductor substrate 2. The resist pattern is used as a mask for wet-etching part of the semiconductor substrate 2 using a KOH (potassium hydroxide) or TMAH water solution to form the diaphragm 9. The diaphragm 9 is formed at a position that includes a region for forming the resistance heat detector 3 and the resistance temperature detector 4 (upstream resistance temperature detector 4a and downstream resistance temperature detector 4b).

There has been described the flow sensor with metal film resistor including the first metal film 15 formed of Mo for the resistance heat detector 3 and the resistance temperature detector 4. For example, major materials for the first metal film 15 include α-Ta (alpha-tantalum), Ti (titanium), W (tungsten), Co (cobalt), Ni (nickel), Fe (iron), Nb (niobium), Hf (hafnium), Cr (chromium), and Zr (zirconium). The other applicable materials include metallic nitride compounds such as TaN (tantalum nitride), MoN (molybdenum nitride), and WN (tungsten nitride) or metallic silicide compounds such as MoSi (molybdenum silicide), CoSi (cobalt silicide), and NiSi (nickel silicide). A preferable material may ensure a large resistance increase against the temperature (temperature coefficient of resistance) such as 2000 ppm/° C. or more.

While there has been described the fourth insulating film 16 made of SiN (silicon nitride) using the CVD method, a plasma CVD method may be used to form a P-SiN film for the fourth insulating film 16. It may also be preferable to form a P-TEOS film over and/or below the fourth insulating film 16 in accordance with the plasma CVD method using TEOS.

Figure 3:
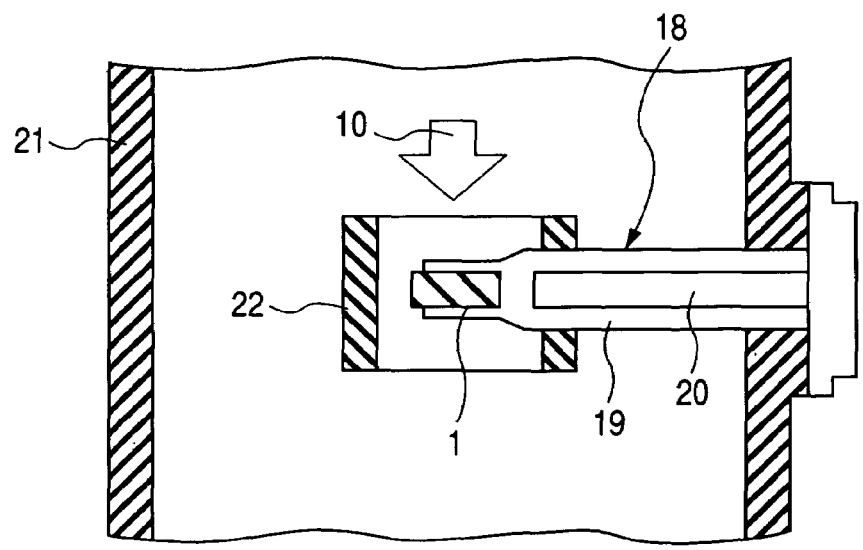

FIG. 3 is a schematic plan view showing arrangement of a thermal air flow meter including the flow sensor with metal film resistor according to the first embodiment of the invention, the flow sensor with metal film resistor being attached to an intake air channel of an internal combustion engine of an automobile and the like. A thermal air flow meter 18 includes the measurement element 1 functioning as the flow sensor with metal film resistor, a support 19 including upper and lower portions, and an external circuit 20. The measurement element 1 is provided for a sub-passageway 22 inside an air intake passageway 21. Intake air flows in the direction indicated by an arrow 10 in FIG. 3 or in the reverse direction depending on conditions of the internal combustion engine.

Figure 4:
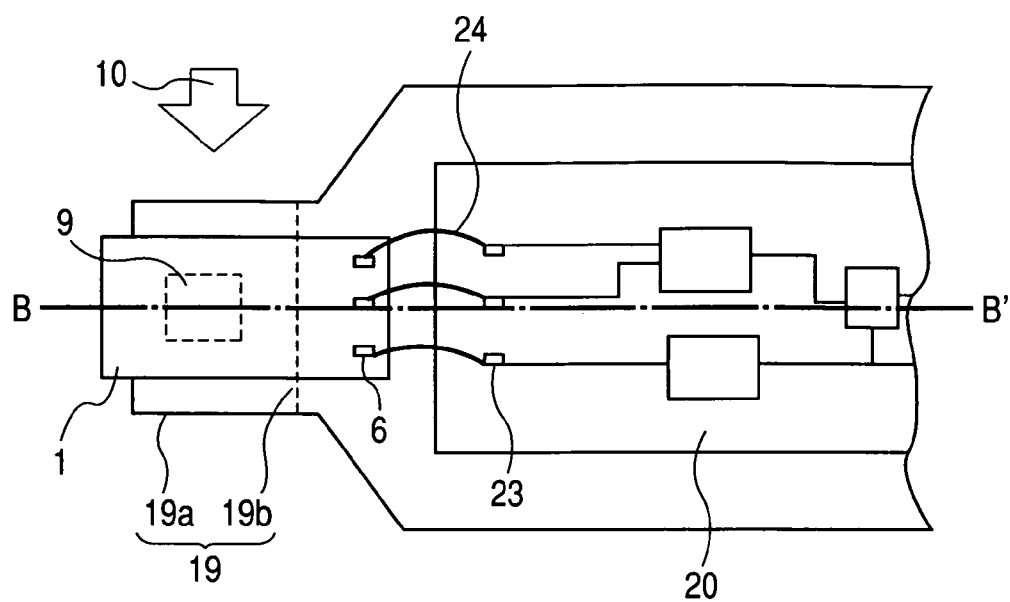
FIG. 4 is a fragmentary plan view showing enlarged part of FIG. 3.
Figure 5:
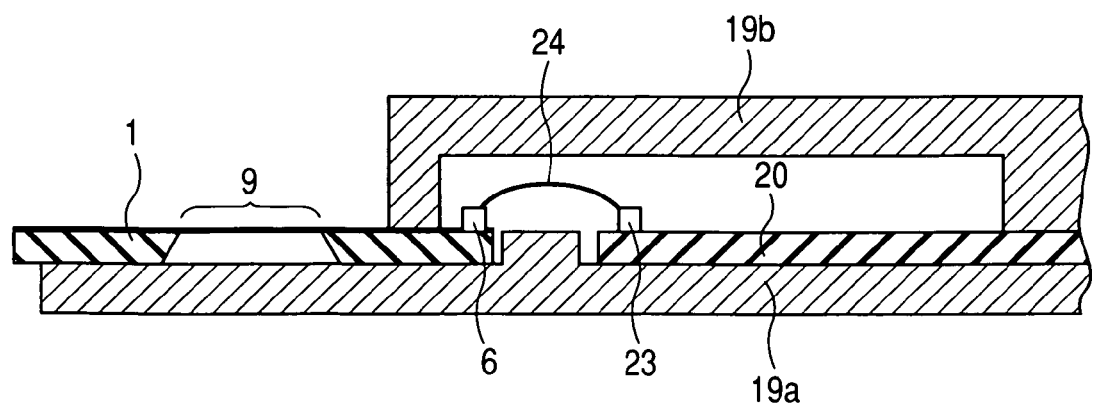
FIG. 5 is a cross-sectional view taken along the line B-B' in FIG. 4.

FIG. 4 is a fragmentary plan view showing enlarged part (the measurement element 1 and the support 19) of FIG. 3. FIG. 5 is a fragmentary sectional view taken along the line B-B' in FIG. 4.

As shown in FIGS. 4 and 5, the measurement element 1 is fixed to a lower support 19a. Using a gold wire 24, for example, wire bonding makes electrical connection between the terminal electrode 6 of the measurement element 1 and a terminal electrode 23 of the external circuit 20. In this manner, the external circuit 20 is electrically connected to the measurement element 1. An upper support 19b covers and protects the terminal electrodes 6 and 23 and the gold wire 24. The upper support 19b may seal the components to be protected.

Figure 6:
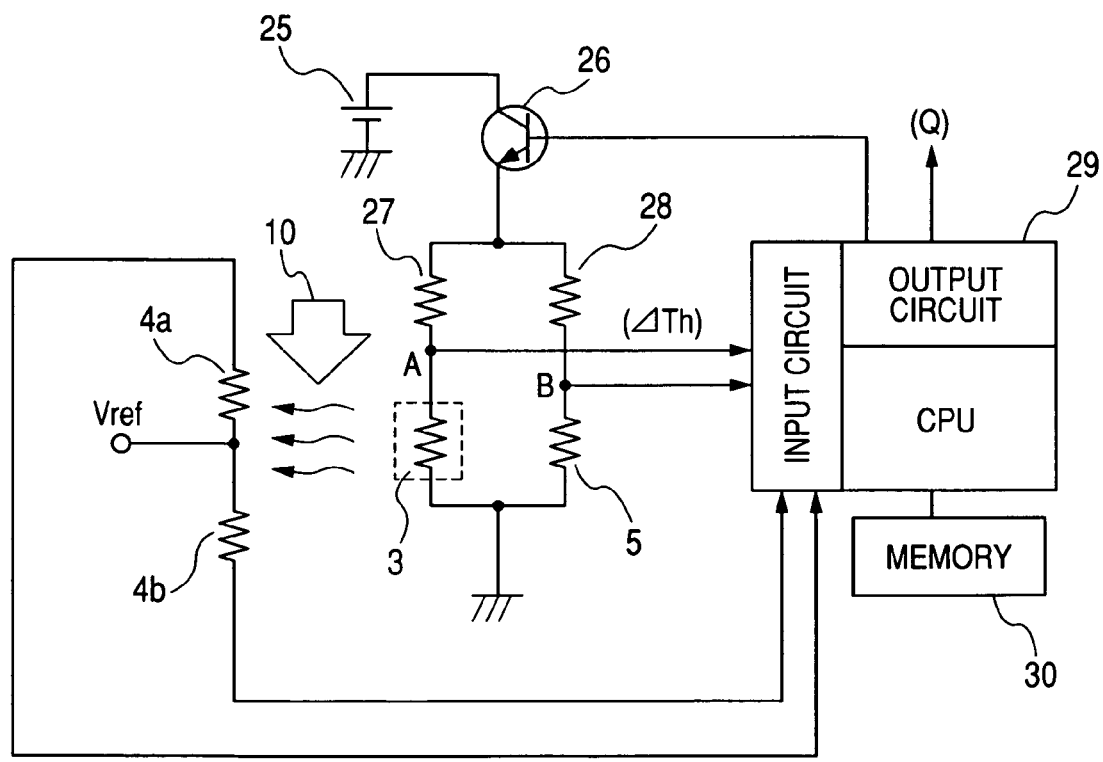
FIG. 6 is a circuit diagram showing an example of the flow sensor with metal film resistor according to the first embodiment of the invention.

Operations of the thermal air flow meter 18 will be described with reference to FIG. 6. FIG. 6 is a circuit diagram showing the measurement element 1 and the external circuit 20 according to the first embodiment. Reference numeral 25 denotes an electric power supply; 26 denotes a transistor for supplying a heating current to the resistance heat detector 3; 27 and 28 denote resistors provided in the external circuit 20; 29 denotes a control circuit that includes a CPU (Central Processing Unit) for arithmetic operations and an output circuit containing an A/D converter; and 30 denotes a memory circuit. The resistors 27 and 28 in the external circuit 20 may be provided in the measurement element 1.

The resistance heat detector 3, the air resistance temperature detector 5, and the resistors 27 and 28 provide a bridge circuit. The control circuit 29 is supplied with voltages from terminals A and B of the bridge circuit. The control circuit 29 configures resistance values of the resistance heat detector 3, the air resistance temperature detector 5, and the resistors 27 and 28. The control circuit 29 controls the detectors and the resistors so that the temperature of the resistance heat detector 3 becomes higher than that of the air resistance temperature detector 5 measuring the air temperature by a specified value such as ΔTh=100° C. When ΔTh deviates from the setting, an output from the control circuit 29 controls a transistor 26 to allow the resistance heat detector 3 to generate a current.

Almost the same resistance value is given to the upstream resistance temperature detector 4a and the downstream resistance temperature detector 4b of the resistance temperature detector 4. The resistance temperature detector 4 is indirectly heated by the resistance heat detector 3 to maintain a constant value. When the intake air flows in the direction of the air flow 10, the upstream resistance temperature detector 4a lowers the temperature and loses the balance with the downstream resistance temperature detector 4b. The control circuit 29 is supplied with values from the upstream resistance temperature detector 4a and the downstream resistance temperature detector 4b, computes the values, and outputs an airflow quantity (Q). The reversed air flow 10 likewise indicates an airflow quantity. Reversal of the air flow 10 can also be detected.

Second Embodiment

The second embodiment of the present invention uses a double-layered structure of an adhesion layer and a metal film for the resistance heat detector, the air resistance temperature detector, the upstream resistance temperature detector, the downstream resistance temperature detector, and the leading wire included in the measurement element as the flow sensor with metal film resistor. The topmost layer is provided with a protective film.

Figure 7:
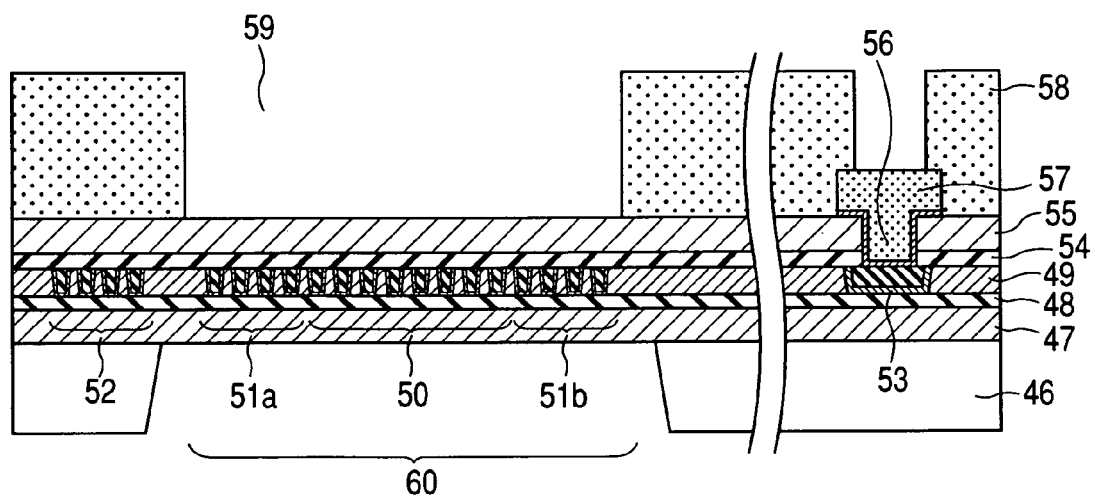
FIG. 7 is a cross-sectional view of a main part of a flow sensor with metal film resistor according to a second embodiment of the present invention.

FIG. 7 diagrams an example of the flow sensor with metal film resistor according to the second embodiment and shows a fragmentary sectional view correspond to the line A-A' in FIG. 1 according to the first embodiment. A first insulating film 47 is formed on a semiconductor substrate 46 made of single-crystalline silicon. Further, a second insulating film 48 and a third insulating film 49 are formed in order. For example, the first insulating film 47 is a $SiO_2$ film approximately 200 nm thick formed in a high-temperature furnace body. The second insulating film 48 is a SiNx film approximately 150 through 200 nm thick. The third insulating film 49 is a $SiO_2$ film formed by the CVD method approximately 200 through 500 nm thick.

A groove 49 is then formed in the third insulating film 49 according to dry etching using a resist pattern mask generated by the photolithography. The groove 49 is formed so that the top is wider than the bottom when viewed in section. A side wall of the groove 49 preferably has an angle equal to or greater than 60° and equal to or smaller than 89°. Since the groove is formed under the condition that the second insulating film 48 is etched slower than the third insulating film 49, the etching stops at the top surface of the second insulating film 48, making it possible to ensure the uniform groove depth.

Sputtering is used to form a TiN film as a first metal film 47 approximately 20 nm. Sputtering is used to deposit a Mo film as a second metal film 48 and form a laminated film of TiN and Mo. The TiN film is used as an adhesion layer for the second insulating film 48 as the base and the third insulating film 49. A slurry is then used to remove the laminated film of the Mo and TiN films other than the groove. The slurry is a mixture of an acidic polishing solution and an oxidizer such as hydrogen peroxide, for example. A leading wire 53 is formed for connecting a resistance heat detector 50, a resistance temperature detector 51 (an upstream resistance temperature detector 51a and a downstream resistance temperature detector 51b), and an air resistance temperature detector 52 with an external circuit. Before forming the first metal film as TiN, sputter etching is conducted using Ar gas to improve an adhesive force of the first metal film for adhesion to the second insulating film 48 and the third insulating film 49.

A fourth insulating film 54 and a fifth insulating film 55 are formed in order. The fourth insulating film 54 is formed approximately 150 through 200 nm thick as an SiNx film based on the CVD method or the plasma CVD method. The fifth insulating film 55 is formed approximately 100 through 500 nm thick as an SiOx film based on the CVD method or as a P-TEOS film based on the plasma CVD method using TEOS.

A connection hole 56 is formed to expose part of the leading wire 53. A third metal film is used to form a terminal electrode 57. The third metal film electrically connects to the leading wire 53 via the connection hole 56. The third metal film is formed as a laminated film of a TiN (titanium nitride) barrier metal film approximately 50 nm thick and an Al alloy film approximately 1 μm thick, for example.

A protective film 58 is then formed. An opening 59 is formed over the terminal electrode 57, the resistance heat detector 50, and the resistance temperature detector 51. The reverse side of the silicon is then etched to form a diaphragm 60. The protective film 58 is made of polyimide approximately 2 to 3 μm thick, for example.

While TiN is used as a material for the first metal film according to the second embodiment, Ti or TaN may be used as well.

Third Embodiment

Figure 8:
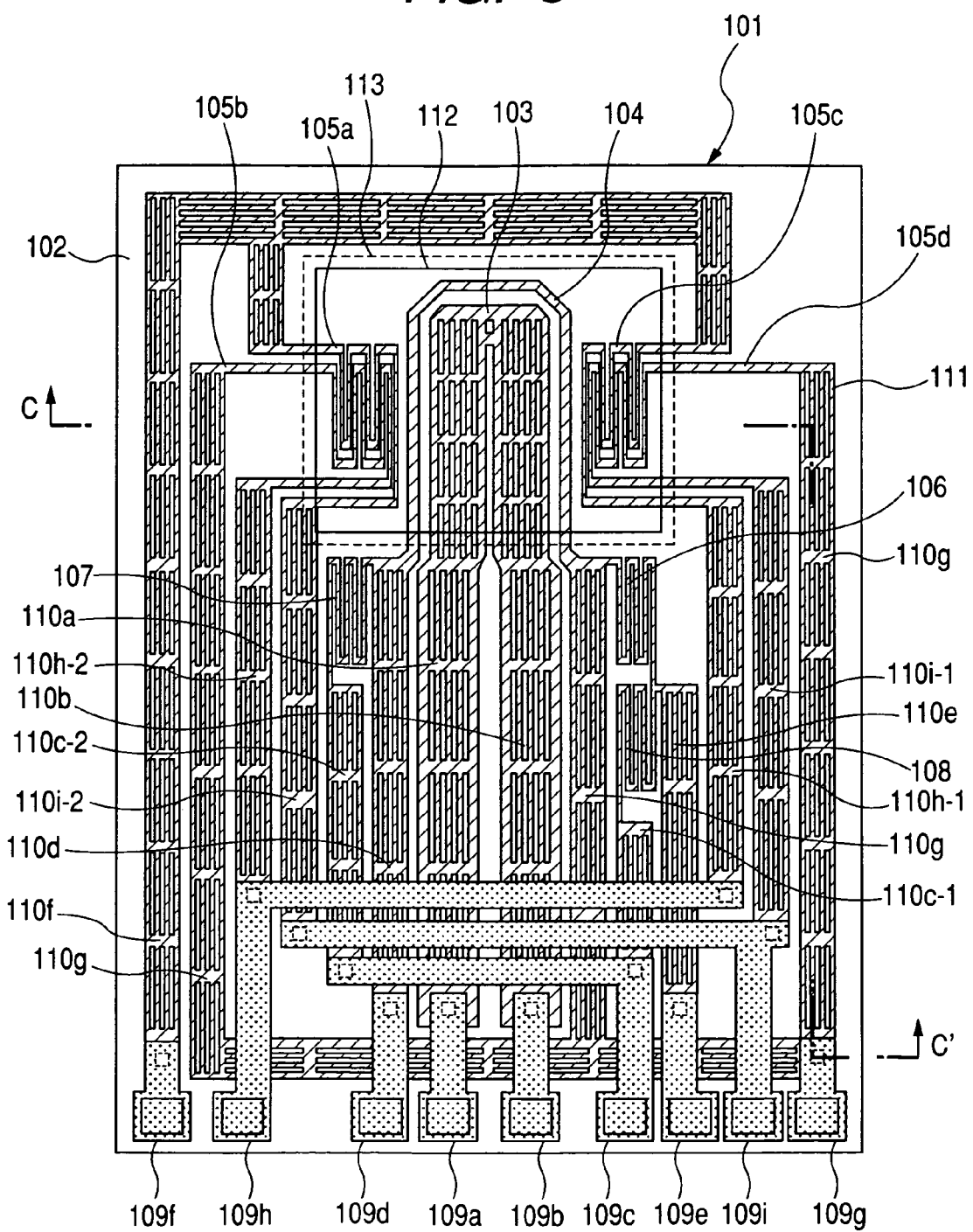
FIG. 8 is a plan view showing a main part of an example of the flow sensor with metal film resistor according to a third embodiment of the present invention.

FIG. 8 is a plan view showing a main part of an example of the flow sensor with metal film resistor according to the third embodiment of the invention.

A measurement element 101 as the flow sensor with metal film resistor includes the following. A semiconductor substrate 102 is made of single-crystalline silicon. A resistance heat detector 103 is formed on the semiconductor substrate 102 via an insulating film. A resistance temperature detector for resistance heat detector 104 detects the temperature of the resistance heat detector 103. A resistance temperature detector 105 detects the temperature of air heated by the resistance heat detector 103 and includes two upstream resistance temperature detectors 105a and 105b and two downstream resistance temperature detectors 105c and 105d. An air resistance temperature detector 106 measures the air temperature. There are provided heater temperature control resistors 107 and 108. Electrodes 109a through 109i connect a signal from the temperature measuring element 101 to an external circuit. A leading wire 110a connects the resistance heat detector 103 to the terminal electrode 109a. A leading wire 110b connects the resistance heat detector 103 to the terminal electrode 109b. Two leading wires 110c-1 and 110c-2 connect the heater temperature control resistor 107 and the heater temperature control resistor 108 to the terminal electrode 109c. A leading wire 110d connects the resistance temperature detector for resistance heat detector 104 and the heater temperature control resistor 107 to the terminal electrode 109d. A leading wire 110e connects the air resistance temperature detector 106 and the heater temperature control resistor 108 to the terminal electrode 109e. A leading wire 110f connects the upstream resistance temperature detector 105a and the downstream resistance temperature detector 105c to the terminal electrode 109f. A leading wire 110g connects the resistance temperature detector for resistance heat detector 104, the air resistance temperature detector 106, the upstream resistance temperature detector 105b, and the downstream resistance temperature detector 105d to the terminal electrode 109g. Two leading wires 110h-1 and 110h-2 connect the upstream resistance temperature detector 105b and the downstream resistance temperature detector 105c to the terminal electrode 109h. Two leading wires 110i-1 and 110i-2 connect the upstream resistance temperature detector 105a and the downstream resistance temperature detector 105d to the terminal electrode 109i.

The resistance heat detector 103 is approximately 10 through 150 µm wide. The resistance temperature detector for resistance heat detector 104 is approximately 0.5 through 10 µm wide. The resistance temperature detector 105, the air resistance temperature detector 106, and the heater temperature control resistors 107 and 108 are approximately 0.5 through 10 µm wide each. The leading wires 110a through 110i are approximately 30 through 500 µm wide each. Plural floating-island insulators 111 are provided within the wiring when the resistance heat detector 103 and the leading wire 110 each have a wider wiring width than the resistance temperature detector 105. An opening 112 is provided for the protective film at least over the resistance heat detector 103, the resistance temperature detector for resistance heat detector 104, and the resistance temperature detector 105. The lower layer is removed from the Si substrate to provide a diaphragm 113. The opening 112 in the protective film is smaller than the diaphragm 113 approximately 50 µm.

Figure 9:
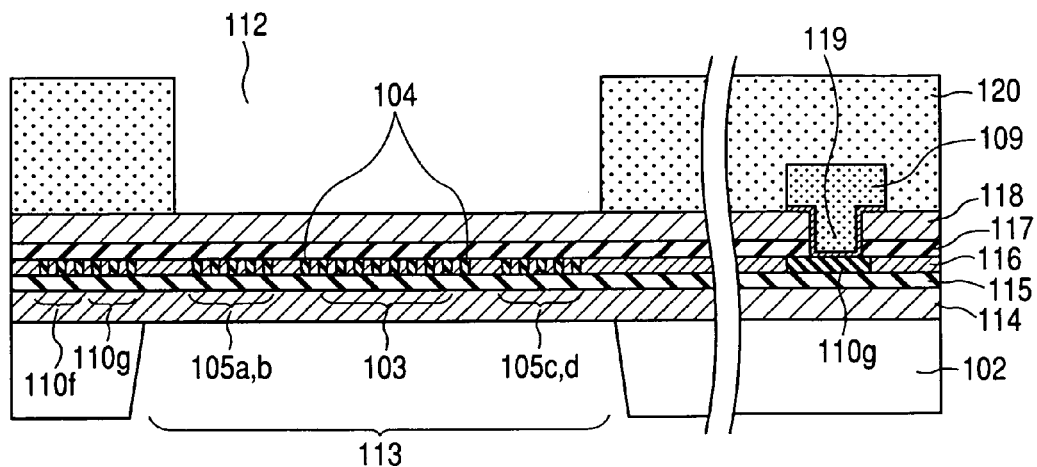
FIG. 9 is a cross-sectional view of the flow sensor with metal film resistor according to the third embodiment of the invention.

FIG. 9 is a fragmentary sectional view taken along the line C-C' in FIG. 8. There is prepared a semiconductor substrate 102 made of single-crystalline silicon. A first insulating film 114, a second insulating film 115, and a third insulating film 116 are formed in order on the semiconductor substrate 102. The first insulating film 114 is a $SiO_2$ film approximately 200 nm thick formed in a high-temperature furnace body. The second insulating film 115 is a SiNx film formed by the CVD method approximately 150 through 200 nm thick. The third insulating film 116 is a $SiO_2$ film formed by the CVD method approximately 100 through 200 nm thick. This thickness is used as a design thickness for the resistors 103 through 108 and the leading wires 110a through 110i.

A groove is then formed in the third insulating film 116 according to dry etching using a resist pattern mask generated by the photolithography. Similarly to the above-mentioned embodiment, a Mo film is deposited as a first metal film 1.5 times thicker than the groove (e.g., 300 nm thick). The film is heated at 1000° C. in a nitrogen atmosphere.

A slurry is then used to remove the Mo film other than the groove and form the resistance heat detector 103, the resistance temperature detector for resistance heat detector 104, the resistance temperature detector 105, the air resistance temperature detector 106, the heater temperature control resistors 107 and 108, and the leading wire 110. The slurry is a mixture of an acidic polishing solution and an oxidizer such as hydrogen peroxide, for example. A density of the acidic polishing solution to the hydrogen peroxide solution is configured to be 1 wt % or lower.

A fourth insulating film 117 and a fifth insulating film 118 are formed in order. The fourth insulating film 117 is formed approximately 150 through 200 nm thick as an SiNx film based on the CVD method or the plasma CVD method. The fifth insulating film 118 is formed approximately 100 through 500 nm thick as an SiOx film based on the CVD method or as a P-TEOS film based on the plasma CVD method using TEOS.

The photolithography is used to form a connection hole 119 in the fourth insulating film 117 and the fifth insulating film 118. The leading wire 110 is partially exposed to form a terminal electrode 109 using a second metal film that is electrically connected to the leading wire 110 via the connection hole 119. The second metal film is formed as a laminated film of a TiN (titanium nitride) barrier metal film approximately 50 nm thick and an Al alloy film approximately 1 µm thick, for example. The barrier metal may be TaN or TiW. The film thickness is preferably 200 nm or less in consideration for a contact resistance.

A protective film 120 is then formed. The photolithography is used to form an opening 112 at least in part of the terminal electrode 109 and over the resistance heat detector 103, the resistance temperature detector for resistance heat detector 104, and the resistance temperature detector 105. A diaphragm 113 is formed thereafter. The protective film 120 is made of polyimide, for example. The film thickness is approximately 2 to 3 µm. The other available materials include a photosensitive organic film. The opening 112 is narrower than at least the diaphragm 113. It is desirable to provide the opening at least over the resistance heat detector 103, the resistance temperature detector for resistance heat detector 104, and the resistance temperature detector 105 so as to efficiently heat the air and accurately measure the heated air temperature. The protective film 120 may remain over part of the resistance heat detector 103 and the resistance temperature detector 105 so as to ensure a strength.

Figure 10:
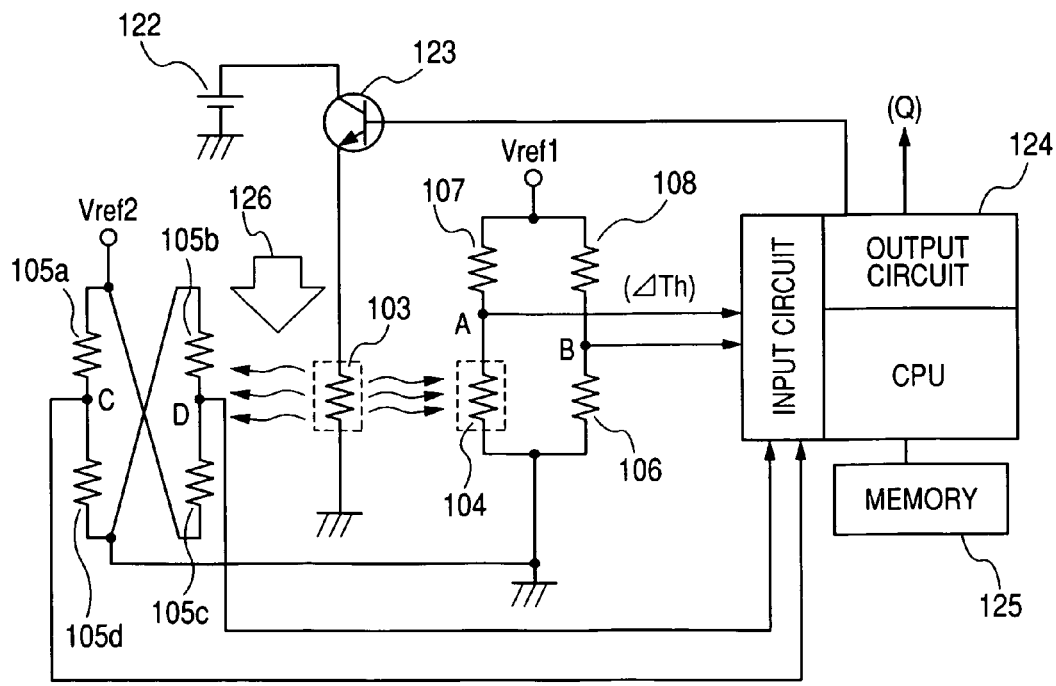
FIG. 10 is a circuit diagram showing an example of the flow sensor with metal film resistor according to the third embodiment of the invention.

Operations of the thermal air flow meter 18 will be described with reference to FIG. 10. FIG. 10 is a circuit diagram showing the measurement element 101 according to the third embodiment and an external circuit. Reference numeral 122 denotes an electric power supply; 123 denotes a transistor for supplying a heating current to the resistance heat detector 103; 124 denotes a control circuit that includes a CPU (Central Processing Unit) for arithmetic operations and an output circuit containing an A/D converter; and 125 denotes a memory circuit.

The circuit includes two bridge circuits. One is a heater control bridge circuit including the resistance temperature detector for resistance heat detector 104, the air resistance temperature detector 106, and the two heater temperature control resistors 107 and 108. The other is a temperature sensor bridge circuit including the four resistance temperature detectors 105a through 105d.

On the measurement element 101 in FIG. 8, the terminal electrode 109c is electrically connected to the two heater temperature control resistors 107 and 108 via the two leading wires 110c-1 and 110c-2. The terminal electrode 109c is supplied with potential Vref1 in FIG. 10. The terminal electrode 109f is electrically connected to the upstream resistance temperature detector 105a and the downstream resistance temperature detector 105c. The terminal electrode 109f is supplied with Vref2 in FIG. 10. The terminal electrode 109g is electrically connected to the air resistance temperature detector 106, the resistance temperature detector for resistance heat detector 104, the upstream resistance temperature detector 105b, and the downstream resistance temperature detector 105d via the leading wire 110g. As shown in FIG. 10, the terminal electrode 109g supplies a ground potential.

The terminal electrode 109d is electrically connected to the resistance temperature detector for resistance heat detector 104 and the heater temperature control resistor 107 via the leading wire 110d and corresponds to a node A in FIG. 10. The terminal electrode 109e is electrically connected to the air resistance temperature detector 106 and the heater temperature control resistor 108 via the leading wire 110e and corresponds to a node B in FIG. 10. The terminal electrode 109i is connected to the upstream resistance temperature detector 105a and the downstream resistance temperature detector 105d via the two leading wires 110i-1 and 110i-2 and corresponds to a node C in FIG. 10. The terminal electrode 109h is connected to the upstream resistance temperature detector 105b and the downstream resistance temperature detector 105c via the two leading wires 110h-1 and 110h-2 and corresponds to a node D in FIG. 10.

According to the embodiment, the terminal electrode 109g supplies a ground potential to the heater control bridge circuit and the temperature sensor bridge circuit in common. Further, it may be preferable to increase terminal electrodes and supply a ground potential from each of the terminal electrodes.

The heater control bridge circuit configures resistance values for the resistance temperature detector for resistance heat detector 104, the air resistance temperature detector 106, and the heater temperature control resistors 107 and 108 so as to maintain 0 V as a potential difference between the node A (terminal electrode 109d) and the node B (terminal electrode 109e) when the temperature of gas heated by the resistance heat detector 103 is higher than an intake temperature by temperature ΔTh such as 100° C. When the temperature ΔTh deviates from the setting, a potential difference occurs between the nodes A and B. The control circuit 124 controls the transistor 123 to vary a current for the resistance heat detector 103 so that the bridge circuit is balanced to maintain potential difference 0 V between the nodes A and B.

The temperature sensor bridge circuit is designed so as to ensure the same distance from the resistance heat detector 103 to each of the resistance temperature detectors 105a, 105b, 105c, and 105d. Even when the resistance heat detector 103 is heating, no air balances a potential difference between the node C (terminal electrode 109i) and the node D (terminal electrode 109h). The potential difference becomes 0 V. When a voltage is applied to the resistance heat detector 103, the intake air flows in the direction of an air flow 126 to cool down the upstream resistance temperature detectors 105a and 105b heated by the resistance heat detector 103. Temperatures of the downstream resistance temperature detectors 105c and 105d rise. The resistance temperature detector 105 indicates different resistance values at the upstream and downstream sides. The temperature sensor bridge circuit is unbalanced to generate a difference voltage between the nodes C and D. The difference voltage is input to the control circuit 124. Memory 125 stores a table of correspondence between difference voltages and airflow quantities. Using the table, the control circuit 124 computes and outputs an airflow quantity (Q). The reversed air flow 126 likewise indicates an airflow quantity. Reversal of the air flow 126 can be also detected.

Fourth Embodiment

The fourth embodiment describes an example of applying the measurement element including the resistance heat detector and the resistance temperature detector to an acceleration sensor.

Figure 11:
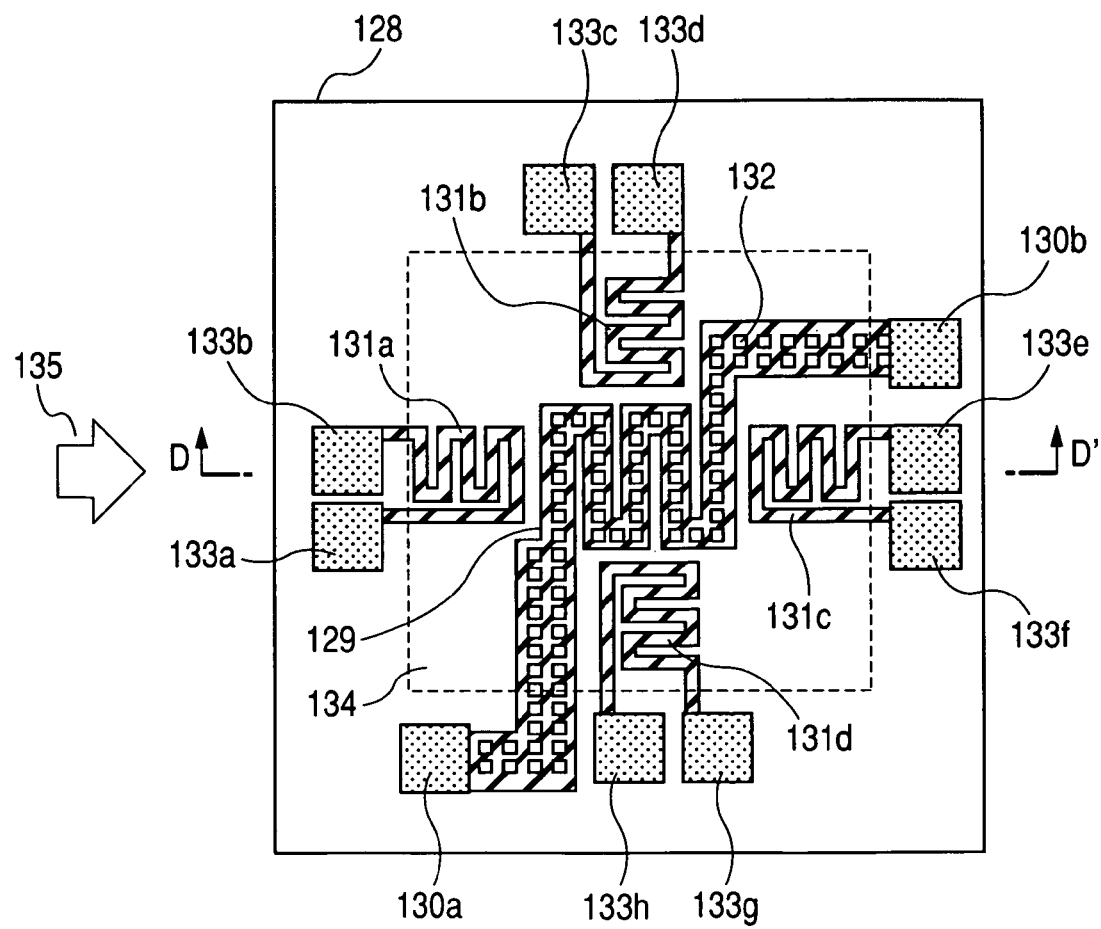
FIG. 11 is a plan view showing a main part of an example of an acceleration sensor according to a fourth embodiment of the present invention.

FIG. 11 is fragmentary plan view showing an example of the acceleration sensor according to the fourth embodiment.

An acceleration sensor 128 includes the following. A resistance heat detector 129 is formed on a semiconductor substrate made of single-crystalline silicon via an insulating film. Terminal electrodes 130a and 130b electrically connect the resistance heat detector 129 with an external circuit. Resistance temperature detectors 131a, 131b, 131c, and 131d have the same length (same resistance value) and are arranged in four directions from the resistance heat detector 129 at a specified interval. Terminal electrodes 133a, 133b, 133c, 133d, 133e, 133f, 133g, and 133h electrically connect the resistance temperature detectors 131a through 131d with the external circuit. The external circuit includes a bridge circuit and the like.

The resistance heat detector 129 indicates a wiring width of approximately 10 through 150 μm. The resistance temperature detector indicates a wiring width of approximately 0.5 through 10 μm. Plural floating-island insulators 132 are provided within the wiring of the resistance heat detector 129 so that an interval between the floating-island insulators 132 or between an insulating section outside the wiring and the floating-island insulator 132 corresponds to a minimum wiring width of the resistance temperature detectors 131a through 131d. When viewed from the top, the floating-island insulator 132 is shaped into a square or a rectangle. The shorter side is longer than or equal to the resistance temperature detector.

The rear of the Si substrate corresponding to the resistance heat detector 129 and the resistance temperature detector 131 is removed so as to be structured as a diaphragm 134.

Figure 12:
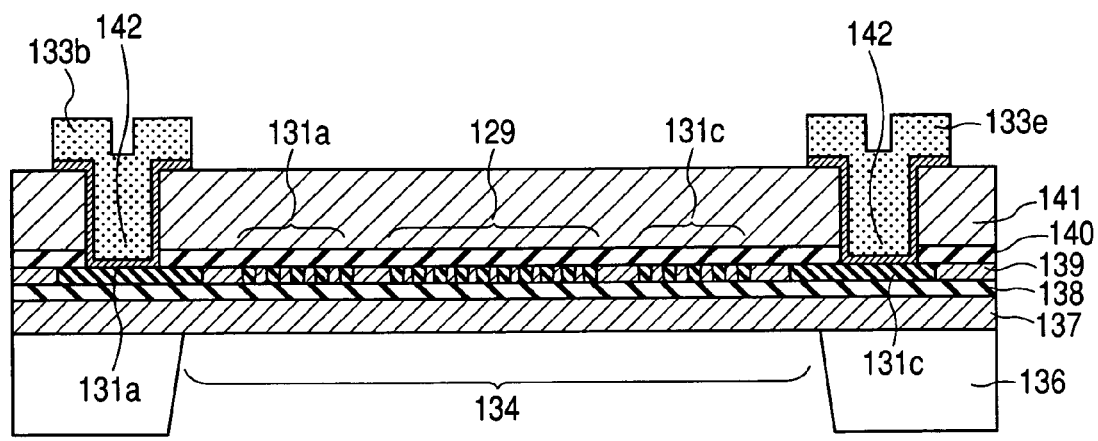
FIG. 12 is a cross-sectional view of the acceleration sensor according to a fourth embodiment of the invention.

FIG. 12 is a fragmentary sectional view taken along the line D-D' in FIG. 11.

A first insulating film 137, a second insulating film 138, and a third insulating film 139 are laminated from the bottom to the top on a semiconductor substrate 136 made of single-crystalline silicon. For example, the first insulating film 137 is a $SiO_2$ film approximately 200 nm thick formed in a high-temperature furnace body. The second insulating film 138 is a SiNx film formed by the CVD method approximately 150 through 200 nm thick. The third insulating film 139 is formed approximately 100 through 200 nm thick as a SiOx film based on the CVD method or the plasma CVD method using TEOS.

The dry etching method is used to form a groove in the third insulating film 139 using a resist as a mask formed by photolithography. On the groove, a Mo film is formed as a first metal film 1.5 times thicker than the groove depth. A slurry is then used to remove the Mo film other than the groove to form the resistance heat detector 129 and the resistance temperature detector 131. The slurry is a mixture of an acidic polishing solution and an oxidizer such as hydrogen peroxide.

A fourth insulating film 140 and a fifth insulating film 141 are formed in order over the resistance heat detector 129 and the resistance temperature detector 131. The fourth insulating film 140 is formed approximately 150 through 200 nm thick as an SiNx film based on the CVD method, for example. The fifth insulating film 141 is formed approximately 100 through 500 nm thick as an SiOx film based on the CVD method or the plasma CVD method using TEOS.

The dry etching is conducted to form a connection hole 142 for connection of the resistance heat detector 129 and the resistance temperature detectors 131a and 131c with the external circuit. Terminal electrodes 133b and 133e are formed thereon. The terminal electrodes 133b and 133e are formed by laminating a 1-μm Al film on an 20-nm TiN film, for example. A KOH or TMAH solution is used to remove the Si film immediately below the resistance heat detector 129 and the resistance temperature detectors 131a and 131c and to form a diaphragm 134.

FIG. 12 shows only the resistance temperature detectors 131a and 131c and omits the other resistance temperature detectors 131b and 131d that are also formed simultaneously with the resistance temperature detectors 131a and 131c. In addition, FIG. 12 shows only the terminal electrodes 133b and 133e and omits the other terminal electrode 133a, 133c, 133d, 133f, 133g, and 133h that are also formed simultaneously with the terminal electrodes 133b and 133e.

Figure 13:
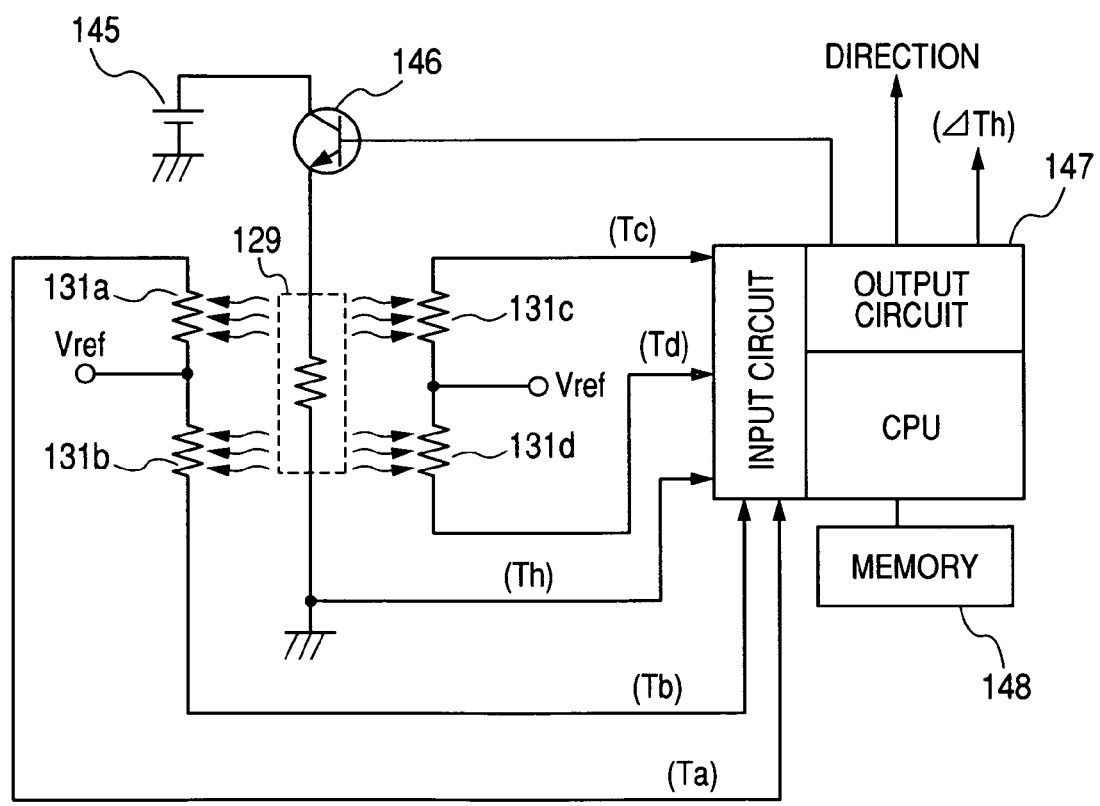
FIG. 13 is a circuit diagram showing an example of the acceleration sensor according to a fourth embodiment of the invention.

Operations of the acceleration sensor will be described with reference to FIG. 13 and FIG. 11 mentioned above. FIG. 13 is a circuit diagram showing the acceleration sensor according to the fourth embodiment and an external circuit.

An external power supply 145 supplies a heating current to the resistance heat detector 129 for indirect heating via a transistor 146. The resistance temperature detectors 131a through 131d are indirectly heated to change resistance values. At this time, a heating current is supplied so that the resistance heat detector 129 maintains a constant resistance value (and a temperature Th). The resistance temperature detectors 131a through 131d are stably provided with a temperature and a resistance value. The resistance temperature detectors 131a through 131d indicate the same temperature (Ta=Tb=Tc=Td) because a constant distance is ensured between the resistance heat detector 129 and each of the resistance temperature detectors 131a through 131d. The resistance temperature detectors 131a through 131d also indicate the same resistance value because these detectors have the same shape.

In this state, let us consider that an external force 135 is applied to the acceleration sensor 128 to operate it as shown in FIG. 11. The indirect heating state is unbalanced. The temperature Ta of the resistance temperature detector 131a differs from the temperature Tc of the resistance temperature detector 131c. The resistance value varies and makes it possible to detect an acceleration. The resistance value difference (voltage difference) is transmitted to an external input circuit of a control circuit 147. The difference is compared with static condition data stored in memory 148. A movement direction and a temperature difference (ΔTh) are computed in a CPU or the like and are output to the outside. An output from the acceleration sensor 128 can be used to adjust the acceleration or turn on or off a switch.

The fourth embodiment describes the acceleration sensor 128 where the four resistance temperature detectors 131a through 131d are arranged in four directions. It is also possible to accurately detect a direction of applying the force 135 by changing the angle of the resistance temperature detector and increasing the number of resistance temperature detectors. The fourth embodiment can be applied to not only the flow sensor with metal film resistor but also the acceleration sensor. A high-sensitive acceleration sensor can be provided.

While there have been described specific preferred embodiments of the present invention, it is to be distinctly understood that the present invention is not limited thereto but may be otherwise variously embodied within the spirit and scope of the invention.

For example, the embodiments describe the flow sensor with metal film resistor including the resistance heat detector and the resistance temperature detector whose metal film is made of Mo. Major materials for the metal film may include α-Ta (alpha-tantalum), Ti (titanium), W (tungsten), Co (cobalt), Ni (nickel), Fe (iron), Nb (niobium), Hf (hafnium), Cr (chromium), and Zr (zirconium). The other applicable materials may include metallic nitride compounds such as TaN (tantalum nitride), MoN (molybdenum nitride), and WN (tungsten nitride) and metallic silicide compounds such as MoSi (molybdenum silicide), CoSi (cobalt silicide), and NiSi (nickel silicide).

While the embodiments use different metal films for the first and second metal films, the same metal film may be used.

What is claimed is:

1. A flow sensor with metal film resistor, having a resistance heat detector and a resistance temperature detector provided beside the resistance heat detector, that measures an airflow, comprising:
a semiconductor substrate;
a first insulating film formed on the semiconductor substrate; and
a second insulating film formed on the first insulating film and includes a groove whose bottom exposes the first insulating film,
wherein the resistance heat detector and the resistance temperature detector are formed of a conductive film embedded in the groove; and
wherein a floating-island insulator formed of the second insulating film is provided inside the resistance heat detector.

2. The flow sensor with metal film resistor according to claim 1,
wherein the resistance heat detector is wider than the resistance temperature detector.

3. The flow sensor with metal film resistor according to claim 2,
wherein a floating-island insulator formed of the second insulating film is not provided inside the resistance temperature detector.

4. The flow sensor with metal film resistor according to claim 1,
wherein the second insulating film forming the groove is etched faster than the first insulating film exposed from the bottom of the groove at an etching speed ratio of three or more.

5. The flow sensor with metal film resistor according to claim 4,
wherein the first insulating film is formed of a silicon nitride film and the second insulating film is formed of a silicon oxide film.

6. The flow sensor with metal film resistor according to claim 1,
wherein a top of the groove is wider than a bottom thereof and a side wall of the groove is formed at an angle equal to or greater than 60° and equal to or smaller than 89°.

7. The flow sensor with metal film resistor according to claim 1,
wherein a floating-island insulator formed of the second insulating film is shaped into a square or a rectangle as a plan view.

8. The flow sensor with metal film resistor according to claim 1,
wherein the conductive film is any one of:
a metal film chiefly formed of any of molybdenum, alpha-tantalum, titanium, tungsten, cobalt, nickel, iron, niobium, hafnium, chromium, zirconium, platinum, and beta-tantalum,
a metallic nitride compound film formed of any of tantalum nitride, tantalum nitride, molybdenum nitride, and tungsten nitride, or
a metallic silicide compound film formed of any of tungsten silicide, molybdenum silicide, cobalt silicide, and nickel silicide.

9. The flow sensor with metal film resistor according to claim 1, further comprising;
a first leading wire that is formed of a conductive film embedded in the groove and connects the resistance heat detector to a first terminal electrode; and
a second leading wire that that is formed of a conductive film embedded in the groove and connects the resistance temperature detector to a second terminal electrode,
wherein a floating-island insulator formed of the second insulating film is provided inside the first leading wire and the second leading wire.

10. The flow sensor with metal film resistor according to claim 1,
wherein the resistance temperature detector includes an upstream resistance temperature detector and a downstream resistance temperature detector;
wherein the resistance heat detector is provided between the upstream resistance temperature detector and the downstream resistance temperature detector; and
wherein a distance between the upstream resistance temperature detector and the resistance heat detector equals a distance between the downstream resistance temperature detector and the resistance heat detector.

11. The flow sensor with metal film resistor according to claim 10,
   wherein the upstream resistance temperature detector further includes first and second upstream resistance temperature detectors;
   wherein the downstream resistance temperature detector further includes first and second downstream resistance temperature detectors; and
   wherein the first and second upstream resistance temperature detectors and the first and second downstream resistance temperature detectors provide a temperature sensor bridge circuit.

12. The flow sensor with metal film resistor according to claim 1, further comprising:
   a heater control bridge circuit including a resistance temperature detector for resistance heat detector, an air resistance temperature detector, and first and second heater temperature control resistors; and
   a third leading wire that is formed of a conductive film embedded in the groove and connects a node between resistors of the heater control bridge circuit with a third terminal electrode,
   wherein a floating-island insulator formed of the second insulating film is provided inside the third leading wire.

13. A flow sensor with metal film resistor, having a resistance heat detector and a resistance temperature detector provided beside the resistance heat detector, that measures an airflow quantity, comprising:
   a semiconductor substrate;
   a first insulating film on the semiconductor substrate; and
   a second insulating film that is formed on the first insulating film and includes a groove whose bottom exposes the first insulating film,
   wherein the resistance heat detector and the resistance temperature detector are formed of a conductive film embedded in the groove; and
   wherein the second insulating film forming the groove is etched faster than the first insulating film exposed from the bottom of the groove at an etching speed ratio of three or more.

14. The flow sensor with metal film resistor according to claim 13,
   wherein the first insulating film is formed of a silicon nitride film and the second insulating film is formed of a silicon oxide film.

15. The flow sensor with metal film resistor according to claim 13,
   wherein a top of the groove is wider than a bottom thereof and a side wall of the groove is formed at an angle equal to or greater than 60° and equal to or smaller than 89°.

* * * * *